United States Patent [19]

McGuigan et al.

[11] Patent Number: 5,248,705

[45] Date of Patent: Sep. 28, 1993

[54] METHOD OF FORMING A POROUS CARBONACEOUS PREFORM FROM WATER-BASED SLURRY

[75] Inventors: Henry C. McGuigan, Schenectady; William B. Hillig, Ballston Lake; Peter J. Meschter, Schenectady, all of N.Y.

[73] Assignee: General Electric Company, Schenectady, N.Y.

[21] Appl. No.: 37,872

[22] Filed: Mar. 29, 1993

Related U.S. Application Data

[62] Division of Ser. No. 859,744, Mar. 30, 1992.

[51] Int. Cl.$^5$ ............................................... C08J 9/00
[52] U.S. Cl. .................... 521/149; 264/29.1; 264/42; 264/45.1; 423/445; 423/448; 427/226; 427/227; 501/80; 521/134; 524/531; 524/612
[58] Field of Search ................ 521/134, 149; 524/531, 524/612

[56] References Cited

U.S. PATENT DOCUMENTS

| | | | |
|---|---|---|---|
| 3,219,731 | 11/1965 | Etzel et al. | 264/105 |
| 3,907,950 | 9/1975 | Bickerdike et al. | 264/105 |
| 3,969,124 | 7/1976 | Stewart | 264/105 |
| 4,320,079 | 3/1982 | Minear et al. | 264/102 |

OTHER PUBLICATIONS

"General Properties of POLYOX Water-Soluble Resins", Union Carbide Brochure, p. 4.
"Furan Derivatives", Encyclopedia of Chemical Technology, 3rd edition, vol. 11, pp. 499-524.

Primary Examiner—Morton Foelak
Attorney, Agent, or Firm—James E. McGinness; James Magee, Jr.

[57] ABSTRACT

A method for forming a porous carbonaceous preform comprises, forming a mixture comprised of up to about 50 volume percent of furfuryl alcohol or tetrahydrofurfuryl alcohol, about 1 to 10 volume percent of a nonionic polyethylene oxide polymer ranging in molecular weight from about 100,000 to 5,000,000, about 30 to 80 volume percent of a carbonaceous material, and the balance water. The mixture is cast to form a body, and heated to decompose the polymer and form the porous preform. A molding composition for carbonaceous material comprises, up to about 50 volume percent of furfuryl alcohol or tetrahydrofurfuryl alcohol, about 1 to 10 volume percent of a nonionic polyethylene oxide polymer ranging in molecular weight from about 100,000 to 5,000,000, about 30 to 80 volume percent of the carbonaceous material, and the balance water.

2 Claims, No Drawings

METHOD OF FORMING A POROUS CARBONACEOUS PREFORM FROM WATER-BASED SLURRY

This application is a division of application Ser. No. 07/859,744, filed Mar. 30, 1992.

This application is related to copending application Ser. No. 07/709,051, filed Jun. 3, 1991, now abandoned.

BACKGROUND OF THE INVENTION

This invention is related to a method for forming carbonaceous preforms, e.g., that can be infiltrated with molten silicon to form silicon carbide bodies or composites. More specifically, it is a method for forming a water based slurry mixture of carbonaceous material into a porous preform.

Infiltration of porous carbonaceous preforms with molten silicon or silicon alloy to form silicon carbide composites is disclosed, for example, in U.S. Pat. Nos. 4,944,904, 5,021,367, 5,043,303, 4,889,686, and 4,981,822, incorporated herein by reference. The preform is formed from a carbonaceous material at least comprised of carbon powder or fibers. The carbonaceous material may also include powders of a metal which reacts with molten silicon to form a metal silicide, such as chromium, molybdenum, tantalum, titanium, tungsten, and zirconium; or a ceramic material which may or may not react with molten silicon including carbides of boron, molybdenum, niobium, silicon, and titanium; nitrides of aluminum, niobium, silicon, titanium, and zirconium; and silicides of chromium, molybdenum, tantalum, titanium, tungsten, and zirconium.

A method of forming the porous carbonaceous preforms from carbon fibers is disclosed in U.S. Pat. No. 4,320,079, incorporated herein by reference. Carbon fiber and a curable binder are blended to produce a stable pourable suspension. The suspension is degassed by use of reduced pressure, and poured into a mold. Excess binder is stripped from the mold, and residual binder is cured to produce a self-supporting shaped preform. Suitable binders for use in the method included, epoxy resins, Krylon, alginates, guargum, and white glue.

While carbon has a low density, other carbonaceous materials such as the reactive metals can have a higher density, and the binder should maintain a homogeneous distribution of the components so that the higher density components do not separate or settle when the carbonaceous material is cast to form the preform. The binder for the carbonaceous material should decompose to leave no residue that is undesirable for the later infiltration of the preform.

Silicon carbide bodies and silicon carbide matrix composites have been formed by the molten silicon infiltration of porous carbonaceous preforms. During infiltration of the porous carbonaceous preforms, there is a reaction between the molten infiltrant and carbon or reactive metal in the preform to form silicon carbide or metal silicides. The reaction closes infiltration pore channels in the preform in direct competition with the continued infiltration of the preform, and is known as reaction-choking. A homogeneous distribution of open porosity in the preform provides a continuous infiltration path, and penetration of the infiltrant throughout the preform.

Low density amorphous carbon fibers or carbon particles having a density of about 1.2 grams per milliliter, increase in volume by about 25 percent when reacted with molten silicon to form silicon carbide. Graphitic carbon, having a higher density of about 2.2 grams per milliliter, increases in volume about 128 percent when reacted with molten silicon to form silicon carbide. Reaction of molten silicon with molybdenum or molybdenum carbide produces volumetric increases of about 159 percent and 176 percent, respectively, in converting to the solids molybdenum disilicide, or molybdenum disilicide plus silicon carbide. When the volume of silicon consumed in such reactions is included, then there is a net volumetric decrease of about 25 percent. Uniform distribution of the carbon powder, fiber, reactive metal, ceramic material, and porosity in the preform minimizes inhomogeneous volumetric changes that occur during infiltration to minimize preform cracking, choking-off of the infiltrant, and retention of latent stresses in the reaction formed body.

One aspect of this invention is to provide a method of forming the carbonaceous material in a water-based slurry mixture into the porous preform.

Another aspect of this invention is to provide a method of forming the porous carbonaceous preform with a uniform distribution of the carbonaceous material and porosity.

BRIEF DESCRIPTION OF THE INVENTION

A method for forming a porous carbonaceous preform comprises, forming a mixture comprised of up to about 50 volume percent of furfuryl alcohol or tetrahydrofurfuryl alcohol, about 1 to 10 volume percent of a nonionic polyethylene oxide polymer ranging in molecular weight from about 100,000 to 5,000,000, about 30 to 80 volume percent of a carbonaceous material, and the balance water. The mixture is cast to form a body, and heated to decompose the polymer and form the porous preform.

Another method of forming the carbonaceous material into a porous preform comprises, forming a mixture comprised of about 1 to 10 volume percent polyethylene oxide polymer, up to about 50 volume percent furfuryl alcohol or tetrahydrofurfuryl alcohol, about 30 to 80 volume percent of the carbonaceous material, and the balance water. The mixture is cast on a nonadherent surface to form tapes having a bottom surface facing the nonadherent surface and an oppositely facing top surface. The tapes are dried to remove liquid, and a coating of an aqueous solution comprised of 50 to 100 volume percent furfuryl alcohol or tetrahydrofurfuryl alcohol is applied to the top and bottom surfaces. The tapes are stacked so that top surfaces face bottom surfaces of adjacent tapes, and pressed to bond the facing surfaces. The tapes are heated to decompose the polymer and form the porous preform.

A molding composition for carbonaceous material comprises, up to about 50 volume percent of furfuryl alcohol or tetrahydrofurfuryl alcohol, about 1 to 10 volume percent of a nonionic polyethylene oxide polymer ranging in molecular weight from about 100,000 to 5,000,000, about 30 to 80 volume percent of the carbonaceous material, and the balance water.

DETAILED DESCRIPTION OF THE INVENTION

We have discovered a method of forming carbonaceous materials in a water-based slurry into near-net shape porous preforms suitable for infiltrating with a molten infiltrant of silicon or a silicon alloy to form silicon carbide bodies or composites. In addition, the preforms can be formed to have sufficient strength to accommodate machining of the preforms into a desired shape.

The mixture is formed with a polyethylene oxide polymer, such as polyox WSR-205 or WSR coagulant, Union Carbide. The polyethylene oxide polymer increases the viscosity of the mixture so that the carbonaceous material can be held in a homogeneous suspension after mixing. When the mixture is comprised of less than about 1 volume percent of the polyethylene oxide polymer, the mixture has a low viscosity that does not maintain the carbonaceous material in suspension, and after the binder is decomposed the preform has insufficient strength. When the mixture is comprised of greater than about 10 volume percent of the polyethylene oxide polymer, the viscosity of the mixture is too high for casting the mixture. Polyethylene oxide polymers in the upper range of average molecular weight are preferably used within the lower volume percent range of the mixture, and polyethylene oxide polymers at the lower end of the molecular range are used within the upper end of the volume percent range in the mixture.

The furfuryl alcohol or tetrahydrofurfuryl alcohol adds plasticity and strength to the body molded from the mixture. Bodies formed from the mixture when it does not contain the furfuryl alcohol or tetrahydrofurfuryl alcohol have a low strength and are brittle so that machining of the body is difficult. When furfuryl alcohol or tetrahydrofurfuryl alcohol is above about 50 volume percent of the mixture, the mixture is difficult to dry and bodies formed from the mixture are too soft and pliable to maintain a desired shape.

The carbonaceous material is at least comprised of carbon, and may include a reactive metal component and a ceramic component. The carbonaceous material can be in the form of a carbon vapor infiltration formed coating, powder particles, or fibers. Preferably, fibers in the carbonaceous material have an aspect ratio of about 5 to 50, and a diameter of about 0.5 to 25 microns. Preferably, powder particles in the carbonaceous material have an average particle size of less than 50 microns, more preferably about 0.5 to 25 microns.

The composition of the carbonaceous material is determinable empirically and depends on the particular silicon carbide body desired, i.e. the particular properties desired in the silicon carbide body. However, the carbonaceous material is at least comprised of an amount of carbon that can react with the infiltrant, and bond the matrix of the body with silicon carbide formed in situ. Carbon can range from about 5 to about 100 volume percent, preferably about 15 to 60 volume percent, of the carbonaceous material. The carbonaceous material as well as any reaction product thereof produced in the infiltration process should not flow to any significant extent and preferably is solid in the infiltration process.

As used herein, the term carbon includes amorphous, single crystal, or polycrystalline carbon, graphite, carbonized plant fibers, lamp black, finely divided coal, charcoal, and carbonized binders such as epoxy, plasticizers, polymer fibers or felt such as rayon, polyacrylonitrile, and polyacetylene.

Carbon powder serves as a source of carbon to react with the infiltrant and form silicon carbide, and as a binder to maintain the shape and integrity of the preform. The carbon powder particles can have a density of about 1.2 to 2.2 grams per milliliter. Preferably, the carbon powder particles are a low density amorphous carbon having a density of about 1.2 to 1.95 grams per milliliter. A suitable carbon powder is a Dylon aqueous graphite powder suspension, Dylon Industries, Inc., Ohio. Other sources for carbon powder are Johnson Matthey, Ma., and Great Lakes Carbon, N.Y. The amount and type of carbonaceous material depends largely on the particular silicon carbide body desired and is determinable empirically.

Preferably, the carbonaceous material is comprised of up to about 70 volume percent, preferably about 20 to 50 volume percent, fibrous carbon in the form of chopped fibers or whiskers. The whiskers promote infiltration by wicking molten silicon into the preform and are a source of carbon for reacting with the infiltrant to form silicon carbide. Long whisker lengths are desirable to achieve good wicking, while short whisker lengths result in better packing and less porosity to fill in the preform. The whiskers also provide strength to the preform. Chopped fibers or whiskers can be described by the aspect ratio of the fiber, i.e. fiber length to diameter. The whiskers have a density of about 1.2 to 2.2 grams per milliliter, preferably, about 1.2 to 1.6 grams per milliliter. Low density furnace insulation type WDF carbon felt, available from Union Carbide, can be crushed and abraded against a wire mesh screen, for example about 40 mesh, to form suitable whiskers. Low density carbon fiber can be formed by carbonizing naturally occurring cellulose fibers, including cotton, chitosan, and bamboo, and chopped or crushed to form the whiskers.

The carbonaceous material also may include up to about 25 volume percent of a reactive metal which reacts with elemental silicon to form a silicide. Reactive metals include molybdenum, chromium, tantalum, titanium, tungsten and zirconium. The reactive metal silicides that form in the preform during infiltration provide a diffusion path for transportation of free silicon to react with carbon, or additional reactive metal, and form high melting temperature silicides. Uniform distribution of the reactive metal in select amounts can minimize the elemental silicon remaining in the reaction formed body. Additional information about carbonaceous materials comprised of reactive metals to minimize elemental silicon in the reaction formed body can be found in copending application Ser. No. 07/709,051, filed Jun. 3, 1991 now abandoned, incorporated herein by reference.

The carbonaceous material may also include a ceramic material, in an amount up to about 50 percent by volume of the carbonaceous material. The ceramic material may or may not react with silicon, and is a ceramic such as a ceramic carbide, a ceramic oxide, a ceramic nitride or a ceramic silicide. The ceramic can be selected to provide additional control of the swelling, the rate of the exothermic reactions occurring during infiltration, or to reduce density in the silicon carbide body. A suitable ceramic material is a ceramic carbide such as boron carbide, molybdenum carbide, niobium carbide, silicon carbide and titanium carbide; a ceramic nitride such as aluminum nitride, niobium nitride, and silicon nitride, titanium nitride and zirconium nitride; a ceramic oxide such as zirconia, alumina, yttria, silica, and mullite; or a ceramic silicide such as chromium silicide, molybdenum silicide, tantalum silicide, titanium silicide, tungsten silicide, and zirconium silicide. The ceramic material can be a powder or fiber, preferably comparable in size to the other carbonaceous materials described above. However, the ceramic material can be continuous fiber lengths, e.g., continuous lengths of reinforcement fibers such as high strength silicon carbide or carbon fibers.

The mixture can be cast into a mold having surfaces nonadherent to the mixture to form a shaped body. A suitable nonadherent surface is high purity grade TEFLON synthetic resin polymer, such as FEP grade TEFLON, Union Carbide. The ethylene oxide polymer thickens the mixture and maintains the homogeneity of the components in the mixture so that higher density components such as the reactive metal powder do not separate or settle during casting of the mixture. The body can be dried by allowing liquid to evaporate. The body is heated to about 70° to 100° C. in air to crosslink the polymer and strengthen the preform. Preforms formed from mixtures not comprised of the furfuryl alcohol or tetrahydrofurfuryl alcohol are suitable for molten silicon infiltration, but the preform is brittle, low strength, and difficult to machine.

Additional strength is provided to the preform by infiltrating into the preform any of the furan derivatives, including furan, furfuryl, furfuryl alcohol or tetrahydrofurfuryl alcohol, or an aqueous solution comprised of at least about 50 volume percent of the furfuryl alcohol or tetrahydrofurfuryl alcohol. A suitable furfuryl alcohol is, for example, 931 Graphite Adhesive, Cotronics, New York. Additional information about furan derivatives can be found in Encyclopedia of Chemical Technology, 3rd edition, Vol. 11, pp. 499-524, incorporated herein by reference. The preform is dried in air, and heated to 100° C. to strengthen the preform. The preform has sufficient strength and plasticity to accommodate machining, or additional forming such as tape layup or lamination. The preform body is heated to about 250° to 300° C. in air to decompose the polymer and furan derivative, and form the porous preform.

An improved mixture for forming tapes is comprised of about 1 to 10 volume percent polyethylene oxide polymer, about 10 to 50 volume percent furfuryl alcohol or tetrahydrofurfuryl alcohol, about 30 to 80 volume percent of the carbonaceous material, and the balance water. At less than about 10 volume percent furfuryl alcohol or tetrahydrofurfuryl alcohol, the tapes adhere poorly during lamination. At greater than about 50 volume percent furfuryl alcohol or tetrahydrofurfuryl alcohol the tapes are difficult to dry, and deform excessively during lamination.

The mixture is cast on a nonadherent surface to form a tape having a bottom surface facing the nonadherent surface, and an oppositely facing top surface. The tapes can be dried at room temperature in air to remove liquid. A coating of the furfuryl alcohol or tetrahydrofurfuryl alcohol is applied to one or both tape surfaces, and the tapes are stacked so that the top surfaces face bottom surfaces of adjacent tapes. A suitable coating can be formed from an aqueous solution comprised of at least 50 volume percent of the furfuryl alcohol or tetrahydrofurfuryl alcohol. The coating bonds the tapes together. The stacked tapes can be pressed at about 5 to 1000 psi between nonadherent molds to flatten the tapes. The consolidated body is heated to decompose the polymer and form the porous preform.

Preforms comprised of a reinforcement phase are readily formed by the method of this invention. The reinforcement phase can be comprised of high strength fibers or whiskers, e.g., carbon, silicon carbide, or boron nitride fibers or whiskers. Preferably carbon or silicon carbide fibers or whiskers are coated with a material resistant to reaction with the molten infiltrant. The reinforcement phase may be random or aligned, continuous, i.e., extending continuously along at least one dimension of the preform, or discontinuous. For example, a fiber reinforced tape can be formed by aligning continuous fibers to be parallel in the length dimension of the tape. The mixture is cast to envelop the fibers and form the fiber reinforced tape. Lamination of the reinforced tapes, and drying and heating to decompose the polymer can be performed as described above.

Preferably, porosity in the preform is an open porosity. By open porosity in the preform, it is meant herein pores, voids or channels that are open to the surface of the preform thereby making the interior surfaces accessible to the molten silicon infiltrant. Preferably, the preform has minimal closed porosity. By closed porosity it is meant herein closed pores or voids, i.e., pores not open to the surface of the preform and therefore, not in contact with the ambient atmosphere. The porosity in the preform is determined by the packing density of the carbonaceous material, i.e., the carbon fibers, carbon powder particles, reactive metal powders, and ceramic powders. In addition, silicon powder can be used as a porosity component in forming the preform since any silicon in the preform will become molten at the infiltration temperature and become part of the infiltrant. Preferably, porosity is between about 25 to 90 volume percent of the preform. In preforms having less than about 30 volume percent porosity, premature reaction-choking occurs and prevents complete infiltration of the preform. A preform having greater than about 50 percent porosity may not have complete infiltration of pores, resulting in incomplete filling of porosity and poor retention of the molten silicon.

Upon infiltration of the preform with molten infiltrant, the carbon fibers, carbon particles, and reactive metal powders in the preform react with the molten silicon to form solid reaction products that occupy larger volumes than did the original components. After infiltration the porosity in the preform is substantially filled with such reaction products, and some fractional swelling of the original unit volume of the preform may occur. The volume of ceramic powders that can be used in the preform remains substantially unchanged. Uniform distribution of the carbon fiber, carbon particles, reactive metal powders, ceramic powders, and porosity in the preform provide for minimization of swelling, cracking, and retained porosity in the reaction formed silicon carbide body or silicon carbide matrix composite.

The carbonaceous preform is contacted with silicon infiltration means whereby silicon is infiltrated into the preform. For example, a structure or assembly is formed comprised of the preform in contact with means that are in contact with silicon and which permit infiltration of molten silicon into the preform. In one infiltration technique, the preform is placed on a woven cloth of carbon, a piece of silicon is also placed on the cloth, and the resulting structure is heated to the infiltration temperature. At the infiltration temperature, the molten silicon migrates along the cloth and wicks into the preform. After infiltration, the wicking cloth may be removed from the silicon carbide body by diamond grinding. Additional information about infiltration can be found, for example in U.S. Pat. No. 4,626,516, incorporated herein by reference.

Additional features and advantages of the method of this invention are shown in the following examples where, unless otherwise stated, the following material and equipment were used. The carbon fiber was WDF carbon felt about 1.2 grams per milliliter in density obtained from Union Carbide, and abraded against a wire mesh screen to form fibers having an average aspect ratio of about 20:1 and average fiber diameter of about 7 microns. The carbon powder was a dried Dylon graphite particulate having an average particle size of about 5 microns, and density of about 2.2 grams per milliliter obtained from Dylon Industries, Ohio. The molybdenum carbide powder had an average particle size of about 5 microns. The silicon carbide powder, Lonza UF-5, had an average particle size of about 2 to 5 microns, Lonza Inc., N.J. The carbon resistance furnace used to form the composite was contained in a vacuum belljar system.

EXAMPLE 1

A carbonaceous material was formed by blending about 24.4 grams of carbon fiber, about 34.7 grams molybdenum carbide powder, 17.7 grams carbon powder, and 23.41 grams of silicon carbide powder. A solution comprised of 90 cubic centimeters water, 30 cubic centimeters furfuryl alcohol, 5 cubic centimeters isopropyl alcohol, and 1 cubic centimeter glycerol was mixed for several minutes, and adjusted to a pH of 12 by adding an aqueous solution of 25 weight percent tetramethylammonium hydroxide. A mixture of the carbonaceous material and about 6 grams of polyethylene oxide, polyox WSR-205, Union Carbide, was ball milled for about 10 minutes. A slurry of the mixture and about 90 cubic centimeters of the solution was vibration milled for 5 minutes in a plastic container with 350 grams of zirconia balls having an average diameter of 0.635 centimeter. The slurry was deaired in a vacuum desiccator.

The slurry was cast by the doctor blade method on a glass plate covered with a sheet of TEFLON FEP to form tapes about 0.5 milliliters in thickness. The tapes were dried in air for several hours to a thickness of about 0.3 millimeters. The tapes were formed having a bottom surface facing the TEFLON coated glass plate, and an oppositely facing top surface. The tapes were cut into sections about 2.73 by 2.73 centimeters. Laminated tapes were formed by stacking about 12 of the tape sections on a sheet of TEFLON. The sections were sprayed with a thin film of furfuryl alcohol on the top surface of each tape section, and stacked one on top of the other so that bottom surfaces faced top surfaces.

The laminated tapes were pressed at about 20 pounds between sheets of TEFLON to flatten the laminated tapes. The laminated tapes were dried in an oven at about 100° C. to increase strength and remove liquid. After several hours the laminated tapes were removed and heated to 250° C. for 1 hour to decompose the polyethylene oxide and furfuryl alcohol, and form tape preforms. The porosity of one of the preforms was measured at about 39 percent. A cross section of another of the preforms was examined metallographically, and was found to have a uniform distribution of carbon powder, carbon fibers, silicon carbide, molybdenum carbide, porosity, and no delamination of the tape sections.

One tape preform and a deposit of 6.5 grams of a silicon alloy comprised of 8 weight percent molybdenum were placed on a carbon fiber cloth, Union Carbide, to form an assembly. A mixture of molybdenum disilicide and isopropyl alcohol was brushed onto the carbon fiber cloth. The assembly was placed in a covered carbon crucible, and heated in the bell-jar furnace to about 1430° C. for 15 minutes in a vacuum. The silicon alloy became molten and infiltrated the preform, reacting silicon with carbon to form a silicon carbide body having a minor phase of molybdenum silicides and silicon filling porosity that remained in the reacted preform. The furnace was cooled to room temperature and the silicon carbide body was recovered. Metallographic examination of the silicon carbide body showed no detectable porosity, no delamination of the original tape layers, and uniform dispersion of the molybdenum silicides and silicon so there was no cracking in the silicon carbide body. The difference in thermal expansion between the molybdenum silicides, silicon carbide, and silicon in the reaction formed body would have caused cracks to form if they had been distributed nonuniformly.

What is claimed is:

1. A molding composition for carbonaceous material comprising,
   up to about 50 volume percent of furfuryl alcohol or tetrahydrofurfuryl alcohol, about 1 to 10 volume percent of a nonionic polyethylene oxide polymer ranging in molecular weight from about 100,000 to 5,000,000 about 30 to 80 volume percent of the carbonaceous material, and the balance water wherein the furfuryl alcohol or tetrahydrofurfuryl alcohol is present in an amount sufficient to add plasticity and strength to a body molded from said mixture.

2. A molding composition according to claim 1 comprised of about 10 to 50 volume percent of furfuryl alcohol or tetrahydrofurfuryl alcohol.

* * * * *